(12) United States Patent
Fussnegger et al.

(10) Patent No.: US 7,104,719 B2
(45) Date of Patent: Sep. 12, 2006

(54) PERIPHERAL CONNECTING REGION OF TWO SHEETS AND PERIPHERAL CONNECTION METHOD

(75) Inventors: Wolfgang Fussnegger, Tuebingen (DE); Matthias Scheffzuek, Tuebingen (DE)

(73) Assignee: DaimlerChrysler AG, Stuttgart (DE)

( * ) Notice: Subject to any disclaimer, the term of this patent is extended or adjusted under 35 U.S.C. 154(b) by 178 days.

(21) Appl. No.: 10/428,004

(22) Filed: May 2, 2003

(65) Prior Publication Data

US 2004/0011769 A1 Jan. 22, 2004

(30) Foreign Application Priority Data

May 4, 2002 (DE) ................ 102 20 100

(51) Int. Cl.
*F16B 7/00* (2006.01)
*F16B 7/04* (2006.01)
*E04D 3/366* (2006.01)

(52) U.S. Cl. .............. 403/272; 403/286; 403/335; 403/338

(58) Field of Classification Search ........ 403/272, 403/286, 335, 338; 24/561, 563; 219/86.1; 52/465
See application file for complete search history.

(56) References Cited

U.S. PATENT DOCUMENTS

| | | | | |
|---|---|---|---|---|
| 1,244,119 A * | 10/1917 | Mulnix et al. | ........ | 52/736.4 |
| 1,723,307 A * | 8/1929 | Sipe | ........ | 52/465 |
| 2,036,725 A * | 4/1936 | Schlicht | ........ | 81/300 |
| 2,611,530 A * | 9/1952 | George | ........ | 24/561 |
| 2,664,089 A * | 12/1953 | Meltzer | ........ | 40/651 |
| 2,881,766 A * | 4/1959 | Tornsjo | ........ | 24/561 |
| 2,894,308 A * | 7/1959 | Eckstein | ........ | 24/561 |
| 3,302,825 A * | 2/1967 | Schleeweiss | ........ | 220/611 |
| 3,381,883 A * | 5/1968 | Harris | ........ | 24/562 |
| 3,574,449 A * | 4/1971 | Rosenberg | ........ | 52/578 |
| 3,864,814 A * | 2/1975 | Bagge | ........ | 29/514 |
| 3,886,676 A * | 6/1975 | Alfonso | ........ | 52/468 |
| 4,033,348 A * | 7/1977 | Cepuritis | ........ | 24/DIG. 11 |
| 4,096,603 A * | 6/1978 | Klaus | ........ | 16/416 |
| 5,024,375 A * | 6/1991 | Wright | ........ | 229/125.39 |
| 5,160,175 A * | 11/1992 | Yang | ........ | 277/626 |
| 5,704,509 A * | 1/1998 | Rosenkrantz | ........ | 403/335 |
| 5,896,715 A * | 4/1999 | Maupas | ........ | 52/465 |
| 6,338,184 B1 * | 1/2002 | Angarola et al. | ........ | 24/20 W |
| 6,439,453 B1 * | 8/2002 | Ramsay | ........ | 229/125.39 |

FOREIGN PATENT DOCUMENTS

| | | |
|---|---|---|
| DE | 2332482 B2 | 1/1978 |
| FR | 641348 | 8/1928 |
| GB | 776452 | 6/1957 |
| GB | 1113575 | 5/1968 |
| GB | 1539747 | 1/1979 |
| JP | 09144229 A * | 6/1997 |

* cited by examiner

*Primary Examiner*—Daniel P. Stodola
*Assistant Examiner*—Ernesto Garcia
(74) *Attorney, Agent, or Firm*—Crowell & Moring LLP

(57) ABSTRACT

In a peripheral connecting region of two sheets including two overlapping flanges of the sheets, the sheets are connected to each other such that they cannot be displaced relative to each other. In order to be able to connect high-strength sheets or other sheets which can be difficult to weld to each other, the sheets are connected in the connecting region by a strip-shaped fastening element. The strip-shaped fastening element encloses the outer contour of the flanges and rests with some sections of its inner side on mutually remote surfaces of the two flanges. A method for producing the connecting region is also proposed.

8 Claims, 3 Drawing Sheets

PERIPHERAL CONNECTING REGION OF TWO SHEETS AND PERIPHERAL CONNECTION METHOD

This application claims the priority of German application 102 20 100.5, filed May 4, 2002, the disclosure of which is expressly incorporated by reference herein.

BACKGROUND AND SUMMARY OF THE INVENTION

The present invention relates to a peripheral connecting region having two sheets which are connected to each other such that they cannot be displaced relative to each other. The invention also relates to a method for providing such a peripheral connecting region with a peripheral connection.

In the car industry, it is frequently necessary to connect body sheets to each other in their peripheral regions. Such connections have hitherto been carried out mainly by means of welding; it is possible for different welding methods to be used.

A welding connection of two sheets is always a problem if the sheets are of materials which are not easy to weld or which cannot be welded at all. This is the case if, for example, high-strength steels or different materials, such as aluminium or plastic, are to be connected to one another. Connection of galvanized sheets by means of welding is also a problem. In this case, other joining methods, such as riveting, are also difficult to carry out.

One object of the invention is the object of proposing a peripheral connecting region of two sheets and a method for producing such a connecting region in which, even when welding is used for materials which are no longer accessible or which can only be accessed with difficulty, a robust, simple to produce and permanent connection of the two sheets is ensured.

This object is achieved according to the invention by way of a peripheral connecting region configured such that it includes two overlapping sheet flanges and a strip-shaped fastening element, which encloses an outer contour of the flanges and rests with some sections of its inner side on mutually remote surfaces of the flanges, by which the sheets are connected. This object is also achieved according to the invention by way of a peripheral connection method in which at least one of two sheets is provided with a hole in a connecting region, a strip-shaped fastening element is folded around an outer contour of sheet flanges in such a manner that it encloses the outer contour and rests with some sections of its inner side on mutually remote surfaces of the sheet flanges, and a deformation region of the fastening element is pressed into the hole and covers the hole. Thus, a connecting region in which the sheets are connected by a strip-shaped fastening element, which encloses the outer contour of the flanges and rests with some sections of its inner side on the mutually remote surfaces of the two flanges, is proposed.

Such a connecting region offers advantages over a welding connection because demands do not have to be placed on the material of the sheets. The fastening element has to be of an extendable material, since it has to be folded around the two flanges. Any conventional steel material is suitable here. Sheets made from different, non-steel or high-strength materials can be connected to one another in this manner.

An adhesive is expediently additionally provided between the inner side of the fastening element and those regions of the flanges which lie opposite the inner side. The strength of the connection can thereby be increased. Furthermore, a leakproof connection can thus be achieved.

At least one flange is advantageously provided with a hole in a region, which is remote from the sheet edge, on the surface, which is remote from the second flange, and a deformation region of the fastening element is pressed into the hole and covers the hole. The fastening element is thereby secured against becoming detached in the direction parallel to the periphery of the flanges.

In a further advantageous embodiment of the connecting region, the flanges have, in the connecting region, overlapping through-holes within which the deformation region of the fastening element is connected non-releasably to an opposite region of the fastening element. In this manner, high connecting region strength is achieved in little structural space.

In a further advantageous embodiment, the flanges protrude from each other at an acute angle in a peripheral region of the connecting region, which peripheral region faces the sheet edge. As a result, the connecting region has a V profile. In this case, at least some sections of the inner side of the fastening element rest in a sheet-like manner in the wedge-shaped cavity formed by the limbs of the flanges. This ensures that the fastening element is connected to the flanges in such a manner that it cannot be detached from the flanges in a direction perpendicular with respect to the periphery of the flanges.

As an alternative or in addition to the holes, the flanges may be provided in the peripheral region with a wavy contour in the longitudinal direction or with a peripheral contour on the periphery of the flanges. This way of securing against the connection becoming detached offers an additional advantage in that stamping of the sheets can be undertaken even before the connecting region is produced and, after the fastening element has been folded up, no further working steps are necessary.

A method according to the invention for providing a peripheral connection of two sheets includes, first of all, providing at least one of the two sheets with a hole in a connecting region. A strip-shaped fastening element is then folded around the outer contour of two flanges in such a manner that it encloses the outer contour and rests with some sections of its inner side on mutually remote surfaces of the two flanges. Finally, a deformation region of the fastening element is pressed into the hole and covers the hole.

In one advantageous embodiment, through-holes are provided as the holes in the sheets. Within the holes, the deformation region of the fastening element is connected non-releasably to an opposite region of the fastening element. The connection thereby obtains high strength.

The deformation region and opposite region of the fastening element are advantageously connected to each other by a rivet. This is a connecting method which can be carried out very simply and cost-effectively.

Furthermore, the deformation region and the opposite region of the fastening element can be connected to each other by means of joints passing through them. This makes it possible for the overlapping holes to be very small, since the joining tool is space-saving. Furthermore, only a little amount of space is required for connecting the sheets.

Furthermore, the deformation region and the opposite region of the fastening element can be connected to each other by means of spot welds. A spot welding method can be carried out very simply, cost-effectively, and without the use of additional components.

Further refinements and advantages of the invention are apparent from the description.

The invention is explained in greater detail with reference to two exemplary embodiments in the drawings.

DETAILED DESCRIPTION OF THE INVENTION

Figure 1:
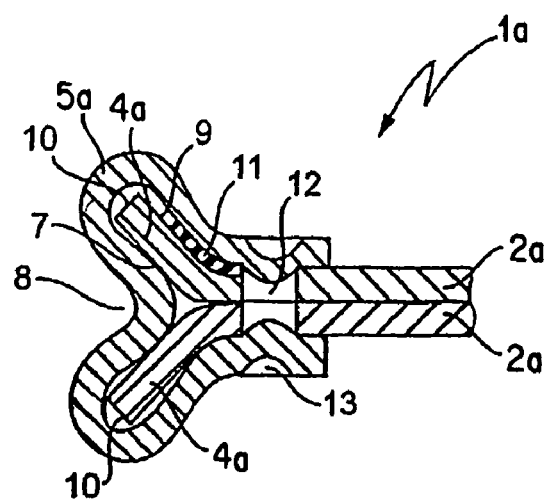
FIG. 1 shows a connecting region of two sheets in a sectional illustration.

FIG. 1 shows a connecting region 1a of two sheets 2a in a sectional view. The two sheets 2a may be of any desired, and even different, materials, in particular of materials which can be welded together with difficulty or not at all, such as high-strength and/or galvanized steels or plastics or aluminium.

The connecting region 1a is formed by two overlapping flanges of the sheets 2a. In the first embodiment of the connecting region 1a shown here, the flanges are angled away from each other in a peripheral region 4a, with the result that the connecting region 1a has a V profile in cross section. A strip-shaped fastening element 5a is also illustrated. This fastening element 5a encloses, in cross section, the outer contour of the flanges which are angled away from each other. The connecting region 1a is designed in such a manner that some sections of the inner side 7 of the fastening element 5a rest on the surfaces 9 of the flanges in the wedge-shaped cavity 8 formed by the two angled flanges. Furthermore, at least part of the inner side 7 of the fastening element 5a also rests on the surfaces 9 of the sheets 2a in the region which is remote from the peripheral region 4a and in which the sheets 2a come into contact with each other. The effect achieved by the fastening element 5a resting in the angled peripheral region 4a is that the fastening element 5a cannot become detached from the flanges in the direction of the sheet edge 10.

In order to obtain greater strength for the connecting region 1a, an adhesive 11 can be provided between the inner side 7 of the fastening element 5a and the surface 9. As an additional securing measure, a plurality of holes 12 lying next to one another are provided parallel to the sheet edge 10 in at least one of the two flanges, in the region remote from the peripheral region 4a. A deformation region 13 of the fastening element 5a, which region in each case lies opposite the holes 12, is pressed into these holes 12 in order to ensure that the fastening element 5a cannot be displaced relative to the flanges in the direction perpendicular with respect to the plane of projection. In this example, such holes 12 lying opposite one another are provided in both flanges.

Figure 2:
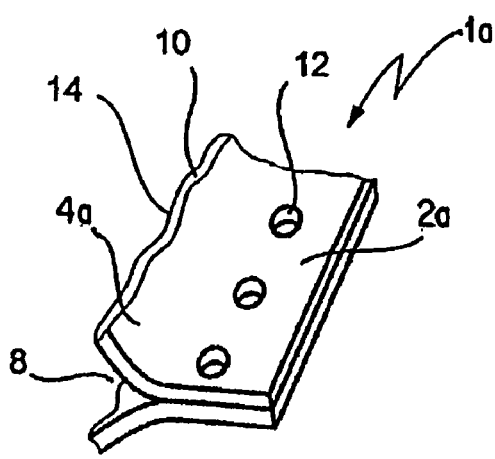
FIG. 2 shows the connecting region in a side view with holes and a peripheral contour.

FIG. 2 shows the connecting region 1a without the fastening element 5a in a side view. The holes 12 in the flanges can be seen clearly here. Furthermore, FIG. 2 shows a further measure with which displacement of the fastening element 5a relative to the flanges is prevented: the flanges have, in the peripheral region 4a, a peripheral contour 14 which fixes the fastening element 5a on the sheet edge 10. The peripheral contour 14 has a wavy shape here, but a tooth-shaped or triangular contour may also be selected.

Figure 3:
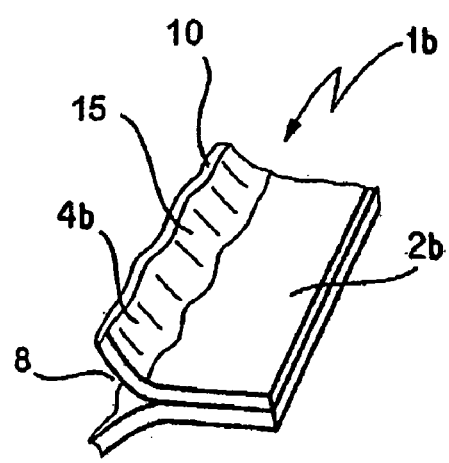
FIG. 3 shows the connecting region in a side view with a wavy contour.

An alternative possibility for fixing the fastening element is illustrated in FIG. 3. In this case, the peripheral region 4b of the flanges has a wavy contour 15 which prevents the fastening element from being displaced in the longitudinal direction of the flanges.

Figure 4A:
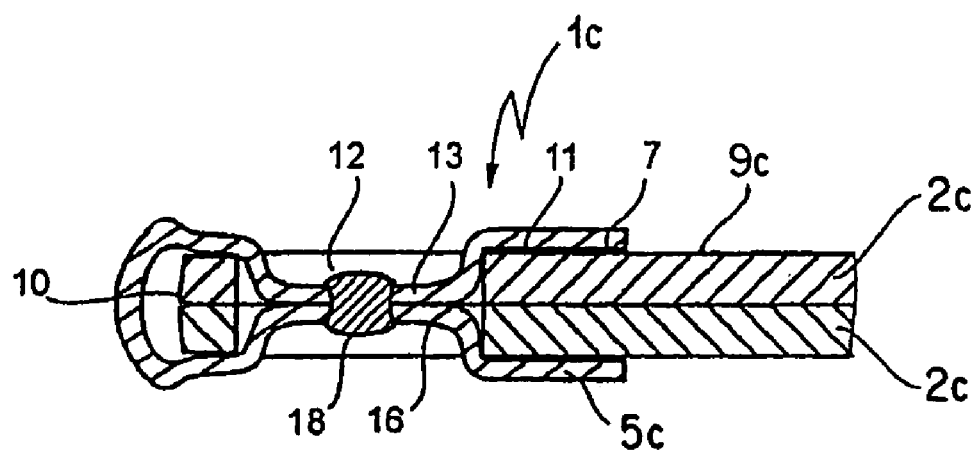
FIGS. 4a–4c show a second embodiment of the connecting region in a sectional illustration, with FIG. 4a showing a spot welding connection, FIG. 4b showing a connection with joints passing through it, and FIG. 4c showing a rivet connection.
Figure 4B:
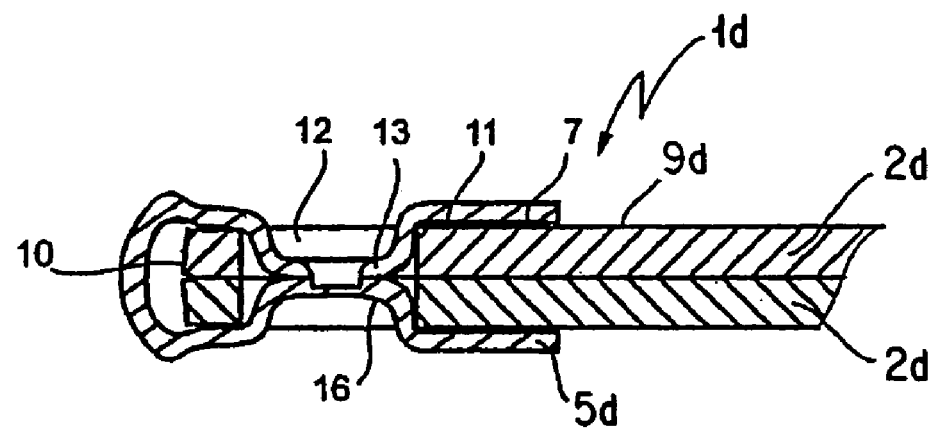
Figure 4C:
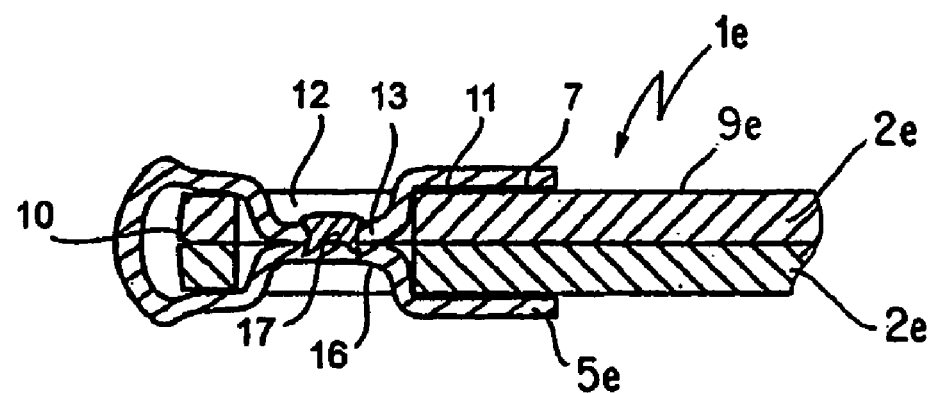
Figure 5:
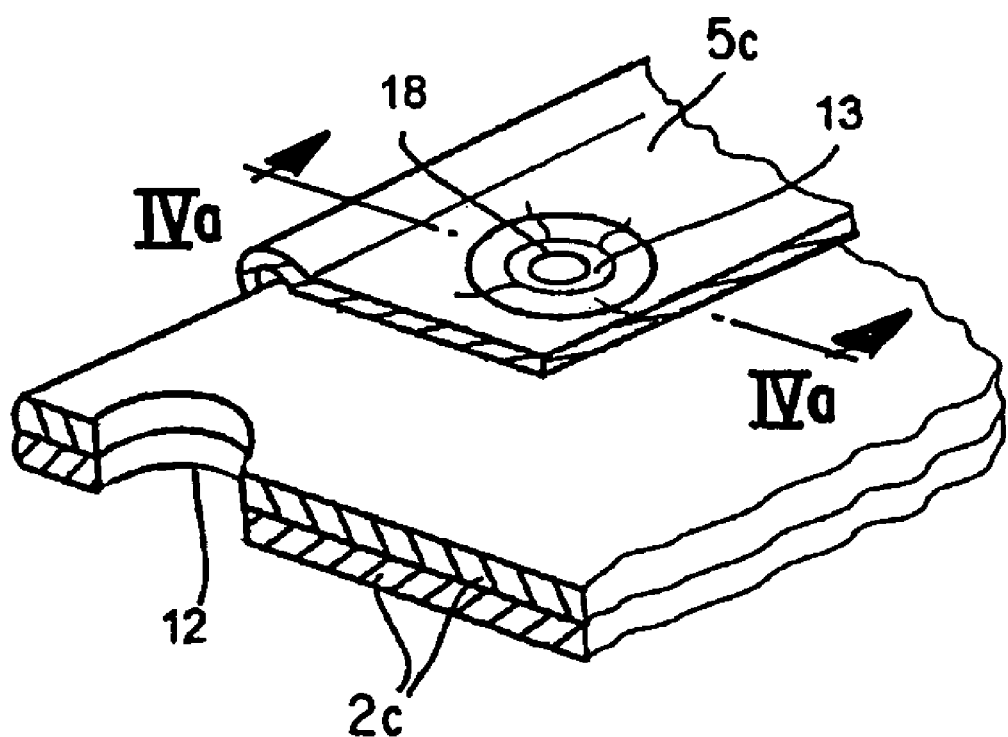
FIG. 5 shows the second embodiment of the connecting region in a side view.

FIGS. 4a–4c illustrate a second embodiment of the connecting region in sectional views, with FIG. 4a being a view along line IVa—IVa of FIG. 5 and with FIGS. 4b and 4c being similar views of alternative connections. The flanges here are not angled away from each other in the peripheral regions 4a or 4b, but rather rest on each other over the entire connecting region 1c, 1d, or 1e. This embodiment is advantageous if the structural space is not sufficient in order to provide angled flanges.

In this embodiment too, the outer contour of the flanges is enclosed by a respective fastening element 5c, 5d, or 5e, and some sections of the inner side 7 of the fastening element rest on the surface 9c, 9d, or 9e of the flanges, in the region remote from the peripheral region. Furthermore, the flanges have overlapping through-holes 12. As in the first exemplary embodiment, adhesive 11 may also be provided here between the inner side 7 of the fastening element 5c, 5d, or 5e and the surface 9c, 9d, or 9e of the sheets 2c, 2d, or 2e, respectively.

Since, in the case of this second exemplary embodiment, the flanges are not angled, the non-displaceability of the connecting region 1c, 1d, or 1e is achieved by other measures: the holes 12 are provided with such a width that it is possible within the holes 12 to connect the deformation region 13 of the fastening element 5c, 5d, or 5e, which region has been pressed into the holes 12, non-releasably to an opposite region 16 of the fastening element 5c, 5d, or 5e. This is possible since, in contrast to the sheets 2c, 2d, or 2e themselves, the fastening element 5c, 5d, or 5e is of a material which can be joined more easily, for example a conventional steel material. In this exemplary embodiment, both the deformation region 13 and the opposite region 16 are pressed into the holes 12, but it is also possible to press only the deformation region 13 into the holes 12 before connection takes place.

One possibility of connecting the two deformation regions 13 resides in the welding (illustrated in FIG. 4a) of the two regions with a welding point 18. FIG. 4b shows, as a second possibility, the regions—the deformation region 13 and opposite region 16—connected by means of joints passing through them, while in FIG. 4c, a rivet 17 connecting the two regions is illustrated. Which of the three methods is used in each case depends, firstly, on the material of the fastening element 5c, 5d, or 5e and, secondly, on the available space for carrying out the connecting method.

FIG. 5 shows the connecting region 1c once again in a side view. The two deformation regions 13 are connected here by a welding point 18, for example.

The method according to the invention for producing the connecting region proceeds in the following steps:

First of all, one sheet or both sheets of each set of sheets 2a–2e is or are provided in the connecting region 1a–1e with the holes 12 which, in the case of holes 12 on both sides, lie opposite each other in the assembled state. If a connecting region 1a or 1b of the first embodiment is to be produced, then the flanges still have to be angled away from each other in the peripheral region 4a or 4b. Furthermore, in this method step, if required, the wavy contour 15 or the peripheral contour 14 can be stamped in in the peripheral region 4a or 4b of the flanges.

In a possible intermediate step, a suitable adhesive 11 is applied to regions of the inner side 7 of the fastening element and/or of the surface of the flanges.

In the following method step, the strip-shaped fastening element 5a–5e is folded around the outer contour of the flanges in such a manner that it encloses the outer contour and rests with some sections of its inner side 7 on the mutually remote surfaces 9 of the two flanges. For this purpose, the fastening element 5a–5e is placed over the outer contour of the flanges and pressed in the regions in which it is to come into contact with the surface 9, 9c–9e of the sheets 2a–2e. The width of the fastening element has to be correspondingly selected in such a manner that the holes 12 are covered. The length of the fastening element is dependent on whether the entire connecting region 1 or only sections thereof are to be covered by the fastening element in the longitudinal direction. The use of a plurality of relatively short fastening elements which are distributed over the connecting region 1 is also conceivable.

After that, in order to secure against displacement, the deformation regions 13 of the fastening element 5a–5e, which regions lie opposite the holes 12, are pressed into the holes 12. In the case of the connecting region 1c, 1d, or 1e according to the second exemplary embodiment, the deformation region 13 is then connected non-releasably to the opposite region 16 of the fastening element 5c, 5d, or 5e by spot welds (according to FIG. 4a), joints passing through them (according to FIG. 4b) or rivets (according to FIG. 4c).

The connecting region and the method are not limited to the two exemplary embodiments explained above.

The holes 12 in the flanges do not have to be configured as through-holes; it is also conceivable just to provide spot-facings in the flanges, into which the material of the deformation region 13 of the fastening element 5a–5e is pressed.

Furthermore, it is not required for the fastening element 5a–5e to tightly enclose the entire surface 9, 9c–9e of the flanges. As shown, each fastening element 5a–5e has an inner side 7 with some sections resting on mutually remote surfaces of the flanges, and there may indeed also be sections in which there is no surface contact between the inner side 7 of the fastening element and the surface 9 of the flanges.

Use may also be made of a further method for non-releasably connecting the deformation region 13 to the opposite region 16 of the fastening element.

Furthermore, the connecting region 1 and the method are not restricted to two sheets; rather, a larger number of sheets may also be connected to one another in this manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A peripheral connecting region of two sheets which are connected to each other such that the two sheets cannot be displaced relative to each other, comprising:
   two overlapping flanges of the sheets, and
   a strip-shaped fastening element, said fastening element enclosing an outer contour of the flanges and having an inner side with some sections resting on mutually remote surfaces of the two flanges,
   wherein the strip-shaped fastening element connects the sheets,
   wherein the flanges protrude from each other at an acute angle in a peripheral region which faces a sheet edge so that the connecting region has a V profile,
   wherein at least some sections of the inner side of the fastening element rest in a wedge-shaped cavity formed by limbs of the flanges, and
   wherein the flanges are provided in the peripheral region with a wavy contour in their longitudinal direction.

2. A peripheral connecting region of two sheets which are connected to each other such that the two sheets cannot be displaced relative to each other, comprising:
   two overlapping flanges of the sheets, and
   a strip-shaped fastening element, said fastening element enclosing an outer contour of the flanges and having an inner side with some sections resting on mutually remote surfaces of the two flanges,
   wherein the strip-shaped fastening element connects the sheets,
   wherein at least a first of the two flanges is provided with a hole in a region, which is remote from a sheet edge, on one of the mutually remote surfaces which is remote from a second of the two flanges,
   wherein a deformation region of the fastening element is pressed into and covers the hole,
   wherein the flanges protrude from each other at an acute angle in a peripheral region which faces a sheet edge so that the connecting region has a V profile, and
   wherein at least some sections of the inner side of the fastening element rest in a wedge-shaped cavity formed by limbs of the flanges.

3. The connecting region according to claim 2, wherein the flanges are provided in the peripheral region with a wavy contour in their longitudinal direction.

4. The connecting region according to claim 2, wherein the flanges are provided in the peripheral region with a peripheral contour.

5. A peripheral connecting region of two sheets which are connected to each other such that the two sheets cannot be displaced relative to each other, comprising:
   two overlapping flanges of the sheets, and
   a strip-shaped fastening element, said fastening element enclosing an outer contour of the flanges and having an inner side with some sections resting on mutually remote surfaces of the two flanges,
   wherein the strip-shaped fastening element connects the sheets,
   wherein at least a first of the two flanges is provided with a hole in a region, which is remote from a sheet edge, on one of the mutually remote surfaces which is remote from a second of the two flanges,
   wherein a deformation region of the fastening element is pressed into and covers the hole, wherein the hole is one of a plurality of overlapping through-holes in the flanges within which the deformation region of the fastening element is connected non-releasably to an opposite region of the fastening element, wherein the flanges protrude from each other at an acute angle in a peripheral region which faces a sheet edge so that the connecting region has a V profile, and wherein at least some sections of the inner side of the fastening element rest in a wedge-shaped cavity formed by limbs of the flanges.

6. The connecting region according to claim 5, wherein the flanges are provided in the peripheral region with a wavy contour in their longitudinal direction.

7. The connecting region according to claim 5, wherein the flanges are provided in the peripheral region with a peripheral contour.

8. The connecting region according to claim 1, wherein the flanges are provided in the peripheral region with a peripheral contour.

* * * * *